United States Patent [19]

Stevens

[11] Patent Number: 5,263,736
[45] Date of Patent: Nov. 23, 1993

[54] SUSPENSION AND SHOCK ABSORBER SYSTEM FOR VEHICLES AND TRAILERS

[76] Inventor: David B. Stevens, 535 Summit Moors Dr., Oconomowoc, Wis. 53066

[21] Appl. No.: 845,622

[22] Filed: Mar. 4, 1992

[51] Int. Cl.$^5$ .............................................. B60G 1/102
[52] U.S. Cl. ................................... 280/688; 267/273;
280/689; 280/697; 280/700; 280/715; 280/723
[58] Field of Search ............... 280/688, 697, 700, 715,
280/723, 689; 267/57, 273

[56] References Cited

U.S. PATENT DOCUMENTS

| 2,163,131 | 6/1939 | Porsche | 267/277 |
|---|---|---|---|
| 2,169,373 | 8/1939 | Porsche | 267/274 |
| 2,194,964 | 3/1940 | Willson | 267/283 |
| 2,606,020 | 8/1952 | Anderson | 267/284 |
| 3,430,978 | 3/1969 | Fortier | 280/723 |
| 3,907,332 | 9/1975 | Richardson | 280/285 |
| 4,010,941 | 3/1977 | Kirkland | 267/273 |
| 4,094,532 | 6/1978 | Johnson et al. | 280/695 |
| 4,451,065 | 5/1984 | Williams, Jr. | 280/284 |
| 4,544,180 | 10/1985 | Maru et al. | 280/689 |
| 4,580,808 | 4/1986 | Smith-Williams | 280/700 |
| 4,723,790 | 2/1988 | Wharton | 280/700 |
| 4,744,588 | 5/1988 | Wharton | 280/700 |
| 4,842,298 | 6/1989 | Jarvis | 280/689 |
| 4,917,402 | 4/1990 | Reynolds et al. | 280/700 |
| 4,921,231 | 5/1990 | Reynolds et al. | 267/196 |

FOREIGN PATENT DOCUMENTS 1437712  6/1976  United Kingdom .

OTHER PUBLICATIONS

"TORSYS" Brochure published by Reynolds Torsion Systems.
"TORAX Steel Torsion Axle Systems" by Reynsorp, published.
"Steel Bars Determine Rating of Torsion Axle Cartridge", published in Design News on Jun. 8, 1987.
"WINGS" article, Road & Track Magazine, Dec., 1974, pp. 109-112.
"Shocking Discovery", published in Automobile Magazine, p. 23.

Primary Examiner—Eric D. Culbreth
Attorney, Agent, or Firm—Andrus, Sceales, Starke & Sawall

[57] ABSTRACT

The suspension system is a cartridge-type having an axle tube, a central tube and an anti-sway bar disposed in the central tube. Each cartridge has a torque absorption hub with a substantially cylindrical outer surface to match the inner surface of the axle tube. A plurality of square torsion bars are disposed between each torque absorption hub and the rotating arm. The arm is connected to the wheel. The torsion bars are disposed in a circular pattern about the central tube. The torsion bars pass through a bearing assembly connected with each rotating arm. The bearing assembly includes self-lubricating needle bearings. The relative position of the torque absorption hub with respect to the axle tube may be changed to change the road height of the vehicle. Torsion bars may be added or removed to change load characteristics. The unique shock absorber system uses a primary shock absorber to absorb relatively small shock forces, and a secondary shock absorber that is mechanically linked to the rotating arm to operate in a progressive fashion. This mechanical linkage includes a secondary arm and two lever arms. The secondary arm may be repositioned by a unique locking mechanism whenever the road height of the vehicle is changed. The entire suspension and shock absorber system is mechanically isolated from the vehicular frame and body by resilient rubber blocks to minimize the transmission of shock forces and road noise to the frame and body.

39 Claims, 8 Drawing Sheets

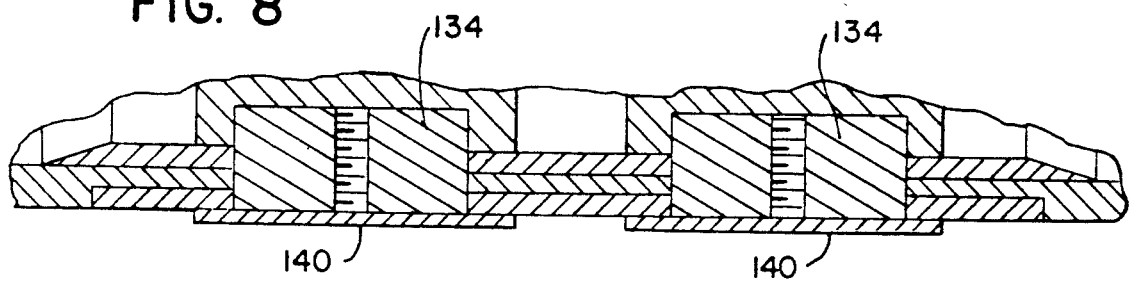

SUSPENSION AND SHOCK ABSORBER SYSTEM FOR VEHICLES AND TRAILERS

BACKGROUND OF THE INVENTION

This invention relates to suspension and shock absorber systems for vehicles, and more particularly to such systems for motor homes, recreational vehicles, trailers, and trucks.

Suspension and shock absorber systems are known which provide a controlled and smooth ride for automobiles. Many of these systems are not readily adaptable to larger motor vehicles, however, since they cannot handle the greater loads of larger vehicles and still provide a controlled and smooth ride. Prior art air suspension systems may be capable of handling large loads while providing a smooth ride, but they are complicated and expensive.

The suspension and shock absorber systems of large motor vehicles such as mobile homes and recreational vehicles must be capable of handling the heavy loads due to the weight of the vehicles while still providing a controlled ride. The prior art all metal suspension systems are incapable of handling both the heavy loads and shock forces while at the same time providing a smooth and stable ride to the occupants traveling in the vehicle. Since such prior art systems are incapable of both handling the heavy loads while at the same time providing a smooth and stable ride, the systems are generally designed to only handle the heavy loads. Thus, the ride for occupants in such vehicles is very rough when smaller roadway discontinuities are encountered by the wheels, such as tar strips and small potholes. Shocks resulting from these relatively small discontinuities are not capable of being absorbed by an all metal prior art system designed to handle the larger shock forces. The ride is thus uncomfortable for the occupants, particularly on long trips which are commonly taken with recreational vehicles.

The rough ride of a recreational vehicle poses additional problems. Since many recreational vehicles also serve as temporary living quarters for the occupants, these vehicles often have fragile items such as dishes and other glassware on counters and in cabinets. The relatively large jolts experienced by these vehicles due to the poor prior art suspension systems may damage or break fragile items.

In the past, most recreational vehicles had rear-wheel drive. Since the space within the rear axle included a differential and other heavy drive components, it was difficult to incorporate a sophisticated suspension and shock absorber system on such vehicles. More recently, front-wheel drive is being increasingly used on large motor vehicles, including mobile homes. Without the drive components in the rear axle, a compact, light weight rear axle utilizing a sophisticated suspension system can provide stable handling combined with a controlled ride.

Prior art suspension systems typically had to be sized for a particular application due to the vast differences in loads which must be carried by different types of vehicles. For example, a cargo-carrying truck would have a different suspension system than a small recreational vehicle. A large recreational vehicle such as a motor home would have a different suspension system than smaller recreational vehicles and trucks. The need to specifically size a suspension system for a particular application increases the cost of the suspension system as well as that of the vehicle itself.

One reason that specially sized suspension systems were needed for each application was the road height of the vehicle changes as the load imposed on the suspension system increases. Since a large truck may carry a larger load than a small truck, a relatively large truck may have an insufficient road height if it is fully loaded. However, the same suspension system on a smaller truck may have an acceptable road height even if it fully loaded. Therefore, it is desirable to provide a suspension system in which the road height may be readily changed to accommodate varying loads so that the suspension system may be used on a wide variety of vehicles.

Another shortcoming of prior art systems is that shock forces imposed on the wheels are readily transmitted to the vehicle's frame and thus to the occupants despite the use of a suspension and shock absorber system. Therefore, it is desirable to minimize the transmission of high impact shock forces from the suspension and shock absorber system to the vehicular frame and body.

SUMMARY OF THE INVENTION

An improved suspension and shock absorber system for motor vehicles and trailers is disclosed which is capable of handling a wide range of loads while still providing a superior ride and high vehicular stability. The system may be used with the rear axle of front-wheel drive vehicles, as in a tag axle of any vehicle, or in any trailer axle.

In a preferred embodiment, the suspension system includes a substantially cylindrical axle housing having rotatable arms at each end. Each arm is adapted to receive a wheel. A central housing is disposed within the axle housing, and an anti-sway bar is disposed within the central tubular housing. Each end of the anti-sway bar is connected to one of the rotatable arms.

The axle housing also has two cartridge-type suspension units, one for each wheel. The suspension unit for each wheel has a torque absorption hub which fits inside of the axle housing and is spaced from the rotatable arm. A plurality of substantially square torsion bars connect the hub and the rotatable arm. Individual torsion bars may be added or removed to change the load characteristics. The torsion bars are disposed about the central housing in a substantially circular pattern. The torsion bar ends fit into corresponding sockets in the hub and in the rotatable arm without fasteners or other retainers.

Also in a preferred embodiment, the motor vehicle road height on each side may be independently changed to accommodate different loads. The torque absorption hub has a substantially cylindrical outer surface which corresponds to the substantially cylindrical inner surface of the axle housing. This outer surface has a plurality of spaced slots therein, each adapted to receive a lock member. The axle housing has a plurality of corresponding apertures therein. The lock member extends into both the axle housing aperture and the torque absorption hub slot to fix the position of the torque absorption hub. To change the road height, a releasable, threaded fastener is threaded into the lock member. The fastener is rotated to remove the lock member, and the torque absorption hub is rotated to a different position and reconnected to the axle housing by replacing the lock members. The slots on the torque absorption hub are spaced so that the same torque absorption hub may be used for either the right wheel or the left wheel. This adjustment system is capable of changing the road height over a 4.5 inch range.

The suspension system also includes a needle-bearing assembly connected to the bearing housing near the pivot end of the rotatable arms. Each bearing assembly includes a raceway and a plurality of bearing needles disposed on the raceway such that each bearing needle rotates at least 180° when the rotatable arm rotates 3° or more. This design insures that each bearing needle will receive adequate lubrication from an adjacent bearing needle whenever the wheel travels a relatively small amount, to prevent undue wear of the raceway. The low friction bearing provides a free springing system that achieves optimal ride quality.

The suspension system according to the present invention is also mechanically isolated from the vehicular frame to prevent shock forces imposed on the suspension and shock absorber system from being transmitted to the frame and to the vehicular body. This isolation is achieved by attaching a suspension bearing housing assembly to each end of the axle housing that is substantially parallel to the road surface. A resilient rubber block is placed between the frame structure and the suspension member near the axle weight center to minimize the transmission of shock forces from the suspension system to the frame. Resilient rubber members are also placed on opposite sides of the suspension member to minimize the transmission of vibrational shock forces between the suspension member and a capturing member attached to the frame. The capturing member limits the lateral movement of the suspension member. A rubber bushing is also mounted at the front end of the suspension member to locate the fore and aft positions of the axle assembly.

The present invention also includes a unique shock absorber system that is capable of providing a smooth ride for a large vehicle.

The shock absorber system comprises a primary shock absorber having one end connected to the rotatable arm and an opposite end connected to a shock absorber locating member, which in turn is connected to the bearing housing assembly. The primary shock absorber absorbs shocks caused by small discontinuities in the roadway such as tar strips and small potholes, and therefore is light in compression load and heavy in rebound load. The system also includes a secondary shock absorber having one end connected to the suspension locating member and an opposite end interconnected with a secondary shock arm assembly, which in turn is connected to the rotatable arm. Impacts from both shock absorbers are isolated from being transmitted to the frame of the vehicle.

The secondary shock arm assembly is designed to extend and compress the higher capacity secondary shock absorber when large discontinuities in the roadway are encountered such as potholes and the like. The secondary shock arm assembly includes an adjustable shock arm attached to the rotatable arm, a short idler lever am attached to the adjustable shock arm, and a longer lever arm connected between the short idler lever arm and the secondary shock absorber. The longer lever arm pivots about a rubber-isolated stationary pivot to compress and extend the secondary shock absorber when the shock forces are sufficiently large to rotate the longer lever arm. The secondary shock arm and the two lever arms are designed such that the secondary shock arm has to move up to 6° or more in the counterclockwise direction before the secondary shock absorber is compressed, thereby allowing the primary shock absorber to operate alone to absorb smaller shock forces resulting from raised tar strips and the like. When the rotating arm moves in a clockwise direction, as when the wheel falls into a pothole, the secondary shock absorber is compressed immediately. The secondary shock absorber is firm in both compression and rebound loading to handle the extreme wheel movements.

The shock absorber system also includes a means for repositioning the secondary shock arm whenever the rotating arm is repositioned to adjust the road height as discussed above. This second repositioning means includes an unique way of changing the position of the rotating arm up to 6° in either direction in 1° increments. This repositioning means includes a central opening in the secondary shock arm, with the opening defining a substantially circular wall in the secondary arm. This circular wall has a plurality of spaced first slots which are preferably semicircular in shape. A substantially circular plate is disposed within the central opening. The plate has an exterior wall that also has a plurality of spaced slots which are semicircular in shape and which have the same diameter as the spaced slots in the secondary arm. The two sets of slots are spaced such that at most one slot on the secondary arm and one slot on the plate line up at any one time. When the slots line up, a locking member is placed between them and a securing mechanism secures the secondary arm wall against the plate wall.

It is a feature and advantage of the present invention to provide a suspension, shock absorber, and road noise isolation system which achieves a comfortable and stable ride for large vehicles while still handling heavy loads.

It is yet another feature and advantage of the present invention to provide a compact cartridge-type suspension system that is easily retrofit into a trailer axle, into the rear axle space of front-wheel drive vehicles, and into the rear tag axle of large and heavy vehicles.

It is yet another feature and advantage of the present invention to improve ride and noise characteristics by mechanically isolating the suspension and shock absorber system from the vehicular frame and body structure.

It is yet another feature and advantage of the present invention to provide a suspension system having a self-lubricating needle bearing that provides a minimum of friction dampening to the rotating arm.

It is yet another feature and advantage of the present invention to provide a shock absorber system for large motor vehicles that is capable of absorbing both small and large shock forces without sacrificing the ride and stability qualities of the vehicle.

It is yet another feature and advantage of the present invention to provide a progressive, mechanical shock absorber system which automatically achieves progressive action without expensive mechanical or computer-controlled adjustments.

It is yet another feature and advantage of the present invention to provide a means for repositioning a shock absorber system when the road height of the vehicle is changed.

It is yet another feature and advantage of the present invention to provide an anti-sway bar inside the axle that does not occupy valuable space outside the axle assembly and that has no bulky linkage attachments between the axle and the vehicle's frame.

These and other features and advantages of the present invention will be apparent to those skilled in the art from the following detailed description of the preferred embodiments and the attached drawings, in which:

BRIEF DESCRIPTION OF THE DRAWINGS

FIG. 7 is a cross sectional end view depicting the means for repositioning the torque absorption hub and one of the lock retaining bands, taken along line 7—7 of FIG. 4.

FIG. 8 is a cross sectional side view depicting the means by which adjacent torque absorption hubs are locked together and depicting the lock retaining bands for the right and left sides, taken along line 8—8 of FIG. 7.

FIG. 11 depicts the shock absorber system operation when a large roadway discontinuity is encountered by the wheel.

FIG. 12 depicts the shock absorber system movement when the primary shock absorber is fully extended, as when the vehicle is jacked up.

FIG. 13 depicts the movement of the secondary shock arm in the "Dead Zone", when the secondary shock absorber is not operating.

DETAILED DESCRIPTION OF PREFERRED EMBODIMENTS

Figure 1:
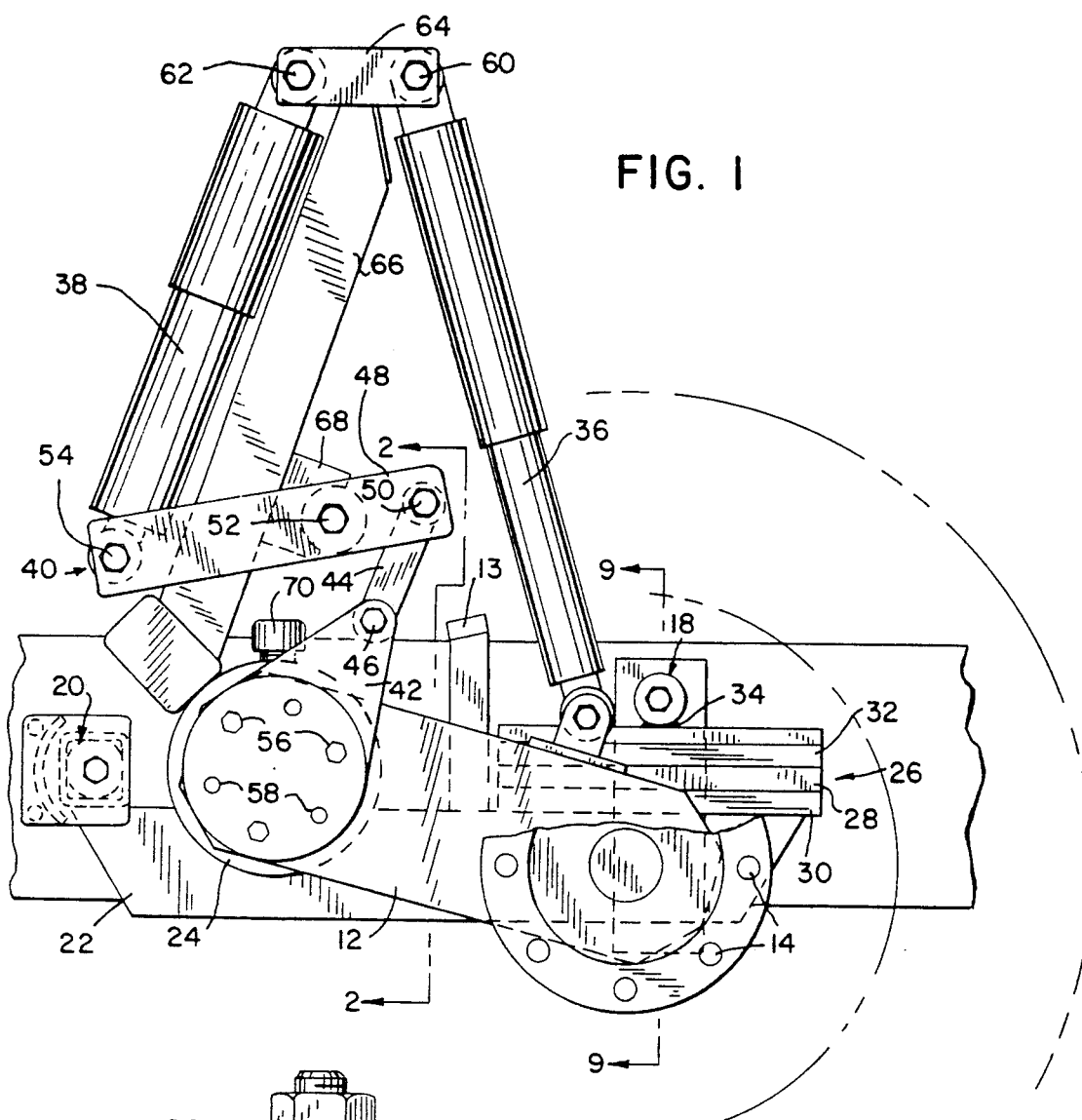
FIG. 1 is the left side view of the suspension and shock absorber system according to the present invention.

FIG. 1 is a side view of the preferred embodiment of the suspension and shock absorber system according to the present invention. The system in FIG. 1 is preferably used for each rear wheel of a front driven motor vehicle, such as a bus, recreational vehicle, or truck. The system may also be used as an axle on non-powered applications such as mobile homes or trailers that need a stable handling, soft ride suspension system. The system provides these functions while occupying the least amount of space due to the compactness of the design.

The embodiment in FIG. 1 has a shock absorber system that is designed for use with vehicles having large rear wheel wells. If there is insufficient space available to hold the shock absorber components, the shock absorber system depicted in FIG. 15 may be used with the suspension system components of FIG. 1.

The primary objective of the suspension and shock absorber system is to provide a smooth ride when both large and small roadway discontinuities are encountered. The system absorbs shocks from small discontinuities such as tar strips while still absorbing shocks and providing vehicular control when large discontinuities such as railroad tracks, large potholes and the like are encountered by the wheels.

The present invention also includes an improved suspension system for handling the torsional forces imposed on the wheel as it encounters roadway discontinuities or as the vehicle negotiates turns. The internal anti-sway bar in the system also provides vehicular stability during turns.

The suspension system is of a cartridge type which enables it to be easily installed and retrofit onto vehicles with minimal modifications to the vehicular frame. The cartridge design allows the system to be adapted to particular applications. For example, torsion bars may be easily added and removed to change the load characteristics. The road height of the vehicle may also be easily changed without modifying the system or the vehicle.

Referring to FIG. 1, which depicts the left side view of the suspension system, a wheel 10 is connected to a rotatable primary arm 12 by bolting the wheel hub through bolt apertures 14. Arm 12 rotates in a counterclockwise direction when smaller roadway discontinuities are encountered by wheel 10 such as raised tar strips and the like. Arm 12 thereafter rotates in a generally clockwise direction after the wheel has passed over the discontinuity. However, arm 12 initially rotates in a clockwise direction when potholes are encountered by the wheel. Bump stop 13 limits the travel of rotating arm 12.

The system is attached to, but mechanically isolated from, vehicular frame member 16 via rubber mounts 18 and 20. Mount 18 is off-center rearward with respect to the axle to insure that a small load is always present on mount 20. During braking, mount 20 absorbs some of the shock forces in the opposite direction to help absorb the braking load.

A suspension member 22 is welded to a bearing housing 82 and is also connected to rubber mount 20. Suspension member 22 is mechanically isolated from frame 16 via a resilient means 26 comprising a rubber block 28 that is retained between two opposed U-shaped members 30 and 32. Member 32 is welded via welds 34 to rubber mount assembly 18. Shock forces from suspension arm 22 are absorbed by rubber block 28, as described more fully below.

The shock absorber system includes a primary shock absorber 36, a secondary shock absorber 38, and a secondary shock arm pivot assembly 40. Primary shock absorber 36 absorbs the smaller shock forces which result when wheel 10 encounters relatively minor roadway discontinuities such as tar strips and the like. Since primary shock 36 is not capable of absorbing large shock forces while still providing a comfortable and controlled ride, secondary shock 38 and shock arm pivot assembly 40 handle the larger shock forces when larger roadway discontinuities such as railroad tracks and large potholes are encountered.

Shock arm pivot assembly 40 also provides a mechanical means for achieving a progressive or non-linear shock absorber action in secondary shock 38 without the need for expensive and complicated computer-controlled shock absorber systems. Assembly 40 also provides for automatic absorption of larger shock forces without the need for manual adjustment as in other prior art shock absorber systems.

Secondary shock arm pivot assembly 40 includes a secondary shock actuating arm 42 which is pivotally connected to an idler lever arm 44 at a pivot 46. Idler arm 44 is pivotally connected to a longer lever arm 48 at a pivot 50. Lever arm 48 pivots about a rubber-mounted stationary pivot 52 to achieve lever action. The opposite end of lever arm 48 is connected to secondary shock 38 at a pivot 54.

To achieve complete action of secondary shock 38, stationary pivot 52 is positioned such that the distance between pivot 54 and pivot 52 is about two and a half times the distance between pivot 52 and pivot 50. To prevent secondary shock 38 from operating when small roadway discontinuities are encountered, pivot arm assembly 40 is designed such that arm 42 rotates approximately 6° in the counterclockwise direction from its curb position before lever 48 moves any significant amount. This 6° of movement is called a "Dead Zone" and is discussed more fully below in connection with FIG. 13.

Secondary shock actuating arm 42 is attached to rotating arm 12 via bolts 56 and dowels 58. Shock absorbers 36 and 38 have their upper ends 60 and 62 respectively attached to member 64 which is in turn attached to bearing housing 82 via an extended support member 66. Stationary pivot 52 is also connected to support member 66 via member 68. Reservoir 70 contains lubricating fluid for the bearing, as more fully discussed below.

Figure 2:
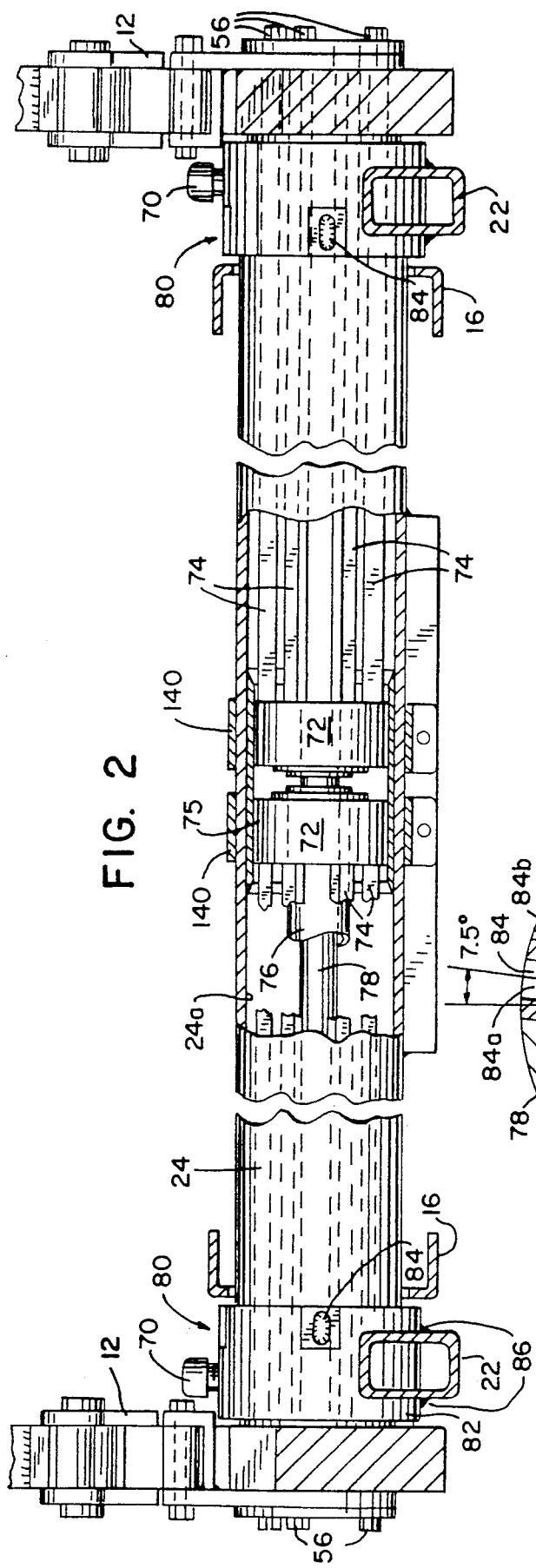
FIG. 2 is a side view of a suspension system according to the present invention, taken along line 2—2 of FIG. 1, with the axle housing being shown in partial section.

FIG. 2 is a side view of a suspension system according to the present invention. As depicted in FIG. 2, axle housing tube 24 has complimentary suspension units on each side, one for each of the wheels. Since these two suspension systems are identical, the same numerical designations have been given to corresponding components of both units.

In FIG. 2, axle housing 24 is substantially cylindrical in shape and has a substantially cylindrical inner surface 24a. Each side of the suspension system has a torque absorption hub 72 which has a substantially cylindrical outer surface corresponding to surface 24a. Torque absorption hubs 72 are preferably surrounded by a cylindrical sleeve 75 to aid in the removal of the axle assemblies and to provide additional wall thickness for axle housing 24. As also shown in FIG. 7 and 8, bands 140 retain the lock members for each torque absorption hub.

Torque absorption hub 72 has a plurality of broached holes (FIG. 7) adapted to receive a plurality of torsion bars 74. Torsion bars 74 are preferably square in shape and are made from ¾" stock. The ¾" torsion bars have a load-carrying capability equal to the largest single wheel capacity for a highway rated tire. Torsion bars 74 preferably have radiused corners to minimize the chances of fatigue failure and to ease their insertion and removal. Up to six torsion bars are disposed in a circular pattern in torque absorption hub 72.

The torsion bars surround a central, tubular axle housing 76 which has one end connected to the torque absorption hub 72 and the other end connected to arm 12. The torsion bars pass through the bearing assembly without interference from the bearing.

An anti-sway bar 78 is disposed inside of central tube 76 and extends the entire length of the axle. The opposite ends of bar 78 are connected to opposed rotating arms 12.

Each end of axle housing 24 has a bearing assembly 80 interconnected therewith. Outer housing 82 of each bearing assembly is locked at welded lugs 84 to axle tube 24 to prevent the axle housing tube from rotating with the rotation of arms 12. The two side lugs 84 are 180° apart, with the top lug 84 being equidistant between the side lugs. Bearing housing 82 is also welded to suspension arm 22 at welds 86.

Figure 3:
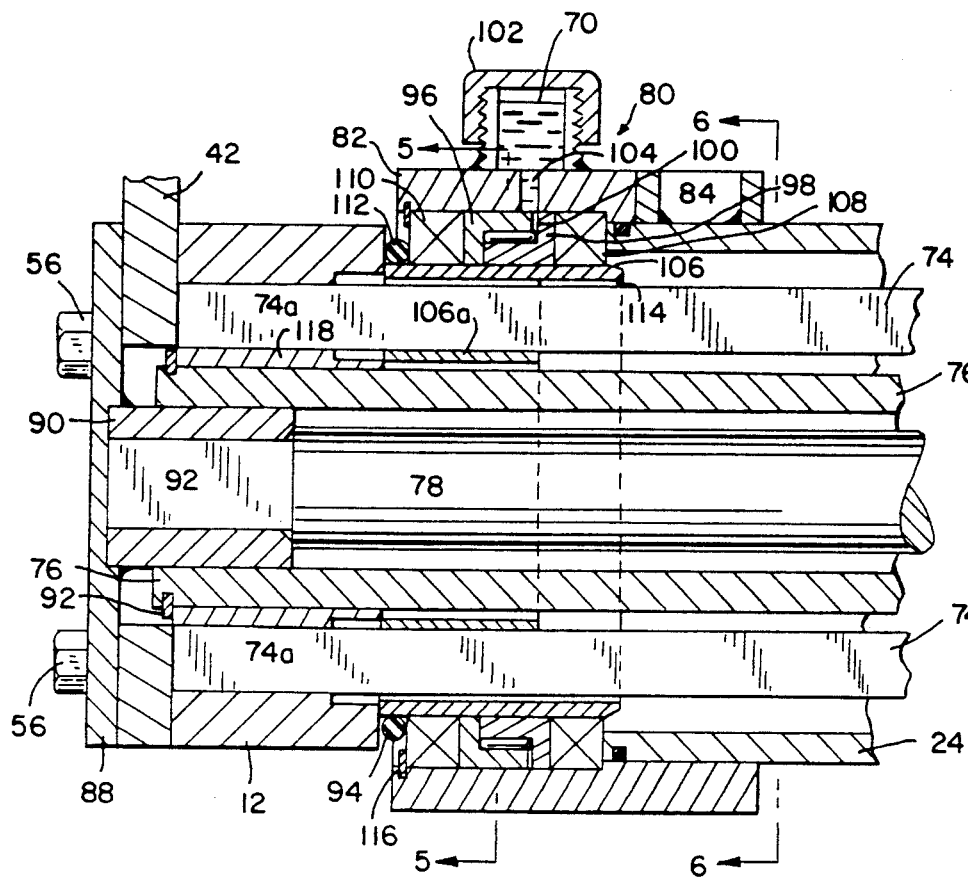
FIG. 3 is a cross sectional side view of the axle tube housing, bearing housing, bearing assembly, and rotating arm assembly of the suspension system.

The internal components of the suspension system of the present invention are depicted in FIGS. 3 through 8. FIG. 3 is a cross sectional side view of the bearing assembly and the rotating arm assembly according to the present invention. In FIG. 3, a plate 88 is welded to tubing 90 which in turn has a square, broached aperture 92 therein. Aperture 92 receives anti-sway bar 78. Since plate 88 and tubing 92 rotate with rotatable arm 12, anti-sway bar 78 will also rotate with arm 12. Tube 76 is press-fit into bearing hub 118 and into arm 12. Tube 76 is knurled along the press fit to insure that it always rotates with arm 12. Central tube 76 also is retained by a retainer ring 92. Ends 74a of torsion bars 74 are disposed in broached holes in arm 12 without the need for any fasteners or other retainers.

Bearing assembly 80 includes an outer bearing housing 82, and raceways 96 and 98 on which a plurality of bearing needles 100 are disposed. There are approximately 200 bearing needles used in each bearing assembly. A needle bearing is used in place of a sleeve bearing to reduce friction dampening, thereby lessening the response time of the suspension system which produces the smooth ride.

Lubricant for the bearing needles is contained in a lubricant reservoir 70 which is covered by a cap 102. Lubricant from reservoir 70 passes through a passageway 104 to lubricate bearing needles 100. The bearing needles are chosen such that a rotation of arm 12 by only 3° causes each of the bearing needles to rotate 180°, enabling each bearing needle to pick up lubricant from an adjacent bearing needle. Thus, each bearing needle is always lubricated, preventing the Burnelling effect. The bearing needles are 11.8 millimeters long, 2 millimeters in diameter and run in 5" diameter raceways.

The raceways are supported by a sleeve 106 which also supports oil seals 108 and 110 and an O-ring 112. The outer portion of sleeve 106 is longer than its inner portion 106a to provide clearance for the torsion bars and also to provide additional length to support oil seal 108. This arrangement also enables the weight of the vehicle to be applied only on the length of sleeve 106 which corresponds to the length of inner portion 106a. An additional clearance 114 is provided between sleeve 106 and torsion bar 74 to avoid interference when the torsion bar is loaded. A snap ring 116 retains oil seal 110 in place.

Figure 5:
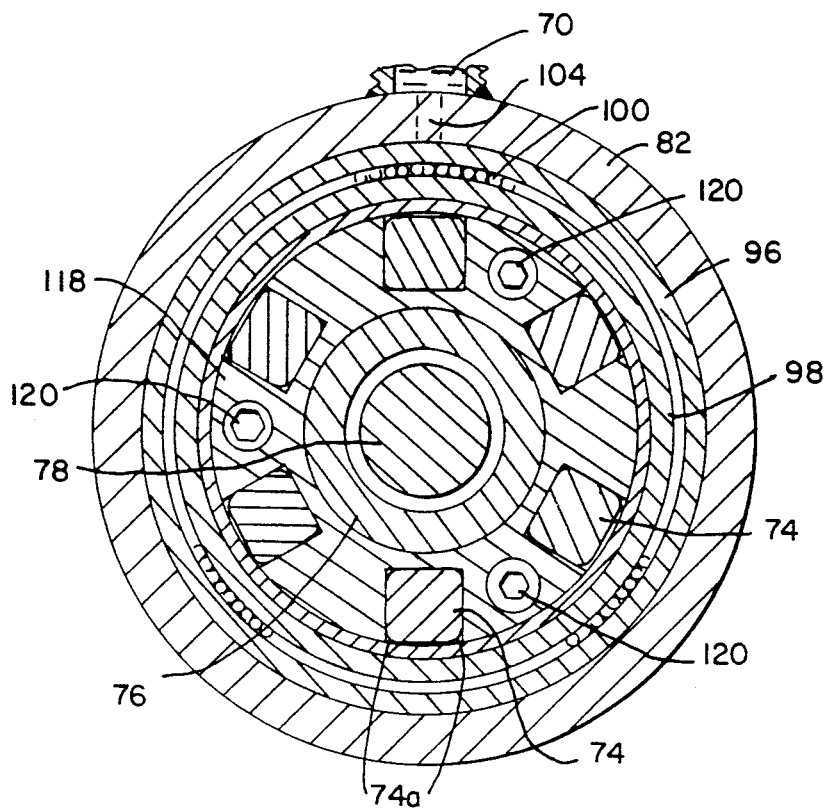
FIG. 5 is a cross sectional end view of the bearing assembly, taken along line 5—5 of FIG. 3.

FIG. 5 is a cross sectional end view of the bearing assembly, taken along line 5—5 of FIG. 3. FIG. 5 more clearly depicts the relationship between all of the components discussed above in connection with FIG. 3. FIG. 5 also depicts torsion bar 74 having radiused corners 74a. Corners 74a are preferably radiused 1/16 of an inch. Bearing hub 118 is bolted to arm 12 by three bolts 120.

Figure 6:
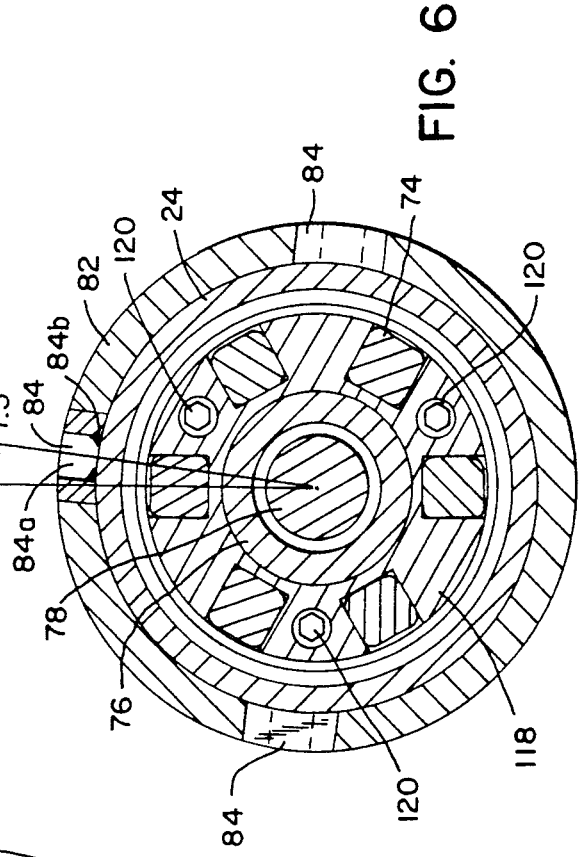
FIG. 6 is a cross sectional end view of the torsion bar-central tube assembly, taken along line 6—6 of FIG. 3.

FIG. 6 is another view of the bearing of FIG. 3, taken along line 6—6 of FIG. 3. FIG. 6 more particularly depicts welded lugs 84 which are used to lock outer bearing housing 82 to axle tube 24. Welds 84 are disposed 7.5° after the 9 o'clock, 12 o'clock, and 3 o'clock positions to enable the same axle housing to be used in two positions. By reversing the installation of the axle housing in the vehicle to 7.5° before the 9 o'clock, 12 o'clock, and 3 o'clock positions, a total of 10 height adjustments of the torque absorption hubs are possible. Each of welds 84 includes a cavity 84a whose perimeter is substantially filled with a welding material 84b.

Figure 4:
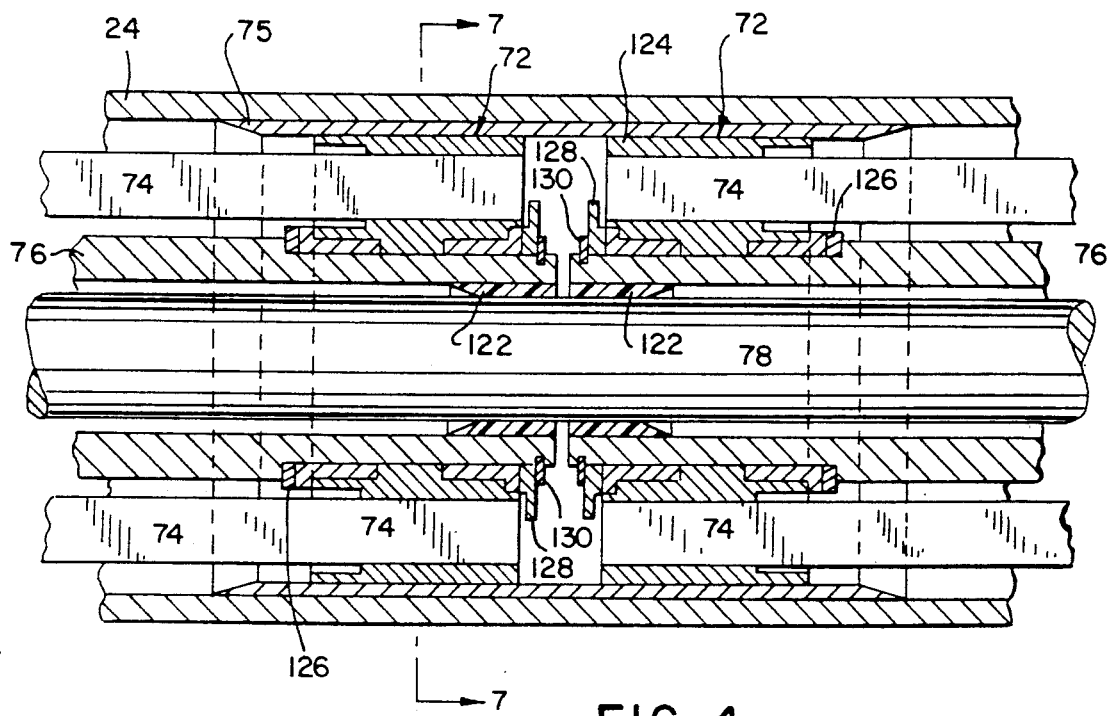
FIG. 4 is a cross sectional side view of the torque absorption hubs depicted in FIG. 2.

FIG. 4 is a cross sectional side view of two torque absorption hubs 72. Since the torque absorption hubs are identical, only one of them will be discussed. Referring to the right hand side of FIG. 4, torque absorption hub 72 has a central opening in which central tube 76 is disposed. Tube 76 is separated from anti-sway bar 78 by a nylon bushing 122. Hub member 124 is retained by a pair of thrust washers 126 and 128, With the entire assembly being held together by a snap ring 130. Torsion bars 74 are disposed in broached holes in hub member 124 without the use of fasteners or other retainers. Sleeve 75 is inserted and welded between axle housing 24 and the torque absorption hub to increase the wall thickness for lock members 134. The reduced diameter of the torque absorption hub also provides more clearance between the axle housing and the torque absorption hub during extraction of the suspension system from the axle housing.

FIGS. 7 and 8 depict the means by which the relative position between the axle housing and the torque absorption hub is maintained, as well as the means for changing the relative rotational position between the axle housing and the torque absorption hub. As shown in FIG. 7, axle housing 24 has a substantially circular inner surface which corresponds to the shape of optional sleeve 75. Also, the outer surface of torque absorption hub 72 is substantially cylindrical. A plurality of slots 132 are formed in the outer surface of torque absorption hub 72. Each of slots 132 is adapted to receive a lock member 134 therein. Lock members 134 are inserted into slots 132 through apertures 138 in the axle housing. The lock members extend into both apertures 138 and slots 132 to fix the relative position between the axle tube and the torque absorption hub. The lock members/aperture assemblies from adjacent torque absorption hubs are covered by bands 140 to keep them in place and to protect them from the elements, as more clearly shown in FIG. 8. Opposite ends of bands 140 are connected by a bolt that is placed through an aperture in bar 141. Bar 141 is welded to axle housing 24. A band 140 retains the lock member for each torque absorption hub. Both the right and left bands 140 are depicted in FIG. 8.

To change the relative position of tube 24 and hub 72, band 140 is slid sideways and then a bolt (not shown) is threaded into each lock member 134. Since each lock member is threaded through its entire depth, continued rotation of the bolt will force the lock member away from the bottom of slot 132, thereby lifting the lock member out of the slot and allowing the position of the torque absorption hub to be changed. The lock members are inserted into new slots to fix the new position.

Slots 132 and their corresponding apertures in the axle housing are arranged in a unique way to enable the same torque absorption hub 124 to be used for either the right wheel or the left wheel on a vehicle axle. Thus, the cost of the suspension system is reduced since only one version of the torque absorption hub needs to be manufactured. To accomplish this result, slots 132 and their corresponding axle tube apertures 138 are spaced in a unique manner. Although torsion bars 74 are spaced 60° from each other to form a symmetrical pattern, slots 132 are not equidistant from each other. Also, slots 132 are not spaced exactly between adjacent torsion bars 74. In FIG. 7, slot 132a is spaced 1½° closer to torsion bar 74a than to torsion bar 74b which allows right and left side torque absorption hubs to be interchangeable and create a 3° change in the position of the torque absorption hub. Also, slots 132a and 132b are 63° apart, instead of 60° apart. Similarly, slots 132b and 132c are 63° apart from each other, as are slots 132a and 132d, slots 132d and 132e, and slots 132e and 132f. However, slots 132c and 132f are only spaced 45° apart. This 1½° initial offset arrangement allows the same—torque absorption hub to be used for both of the rear wheels.

The hubs are marked "right" and "left" and have stamped thereon positions 1 through 5. This is done even though the hubs are identical in shape since the angular rotation of the hub reverses when the hub is used on the other vehicular side to achieve the identical road height position and to create the 3° change for each setting. Assembly is thereby facilitated since the chance for an erroneous placement of the torque absorption hub is minimized. Thus, it is much more likely that both torque absorption hubs will be correctly positioned.

This arrangement of the slots in the torque absorption hub also enables the road height of the vehicle to be changed in relatively small increments. Each rotation of the torque absorption hub to the next position changes the position of the torque absorption hub by 3°, which equals ⅜" of arm 12 movement.

The suspension and shock absorber system also includes a means for mechanically isolating components of the system from the vehicular frame to prevent impact, shock and other forces from being transmitted from the system to the vehicular frame and body. This mechanical isolation results in much less road noise while at the same time providing adequate support for the vehicular load.

Figure 10:
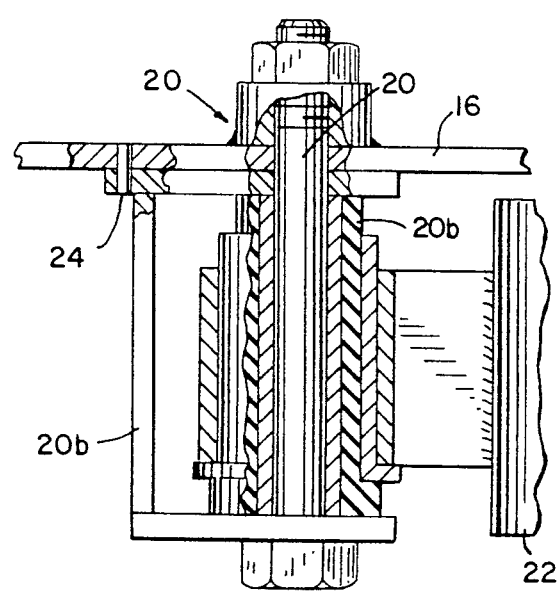
FIG. 10 is a cross sectional top view of an isolating pivot of FIG. 1.
Figure 9:
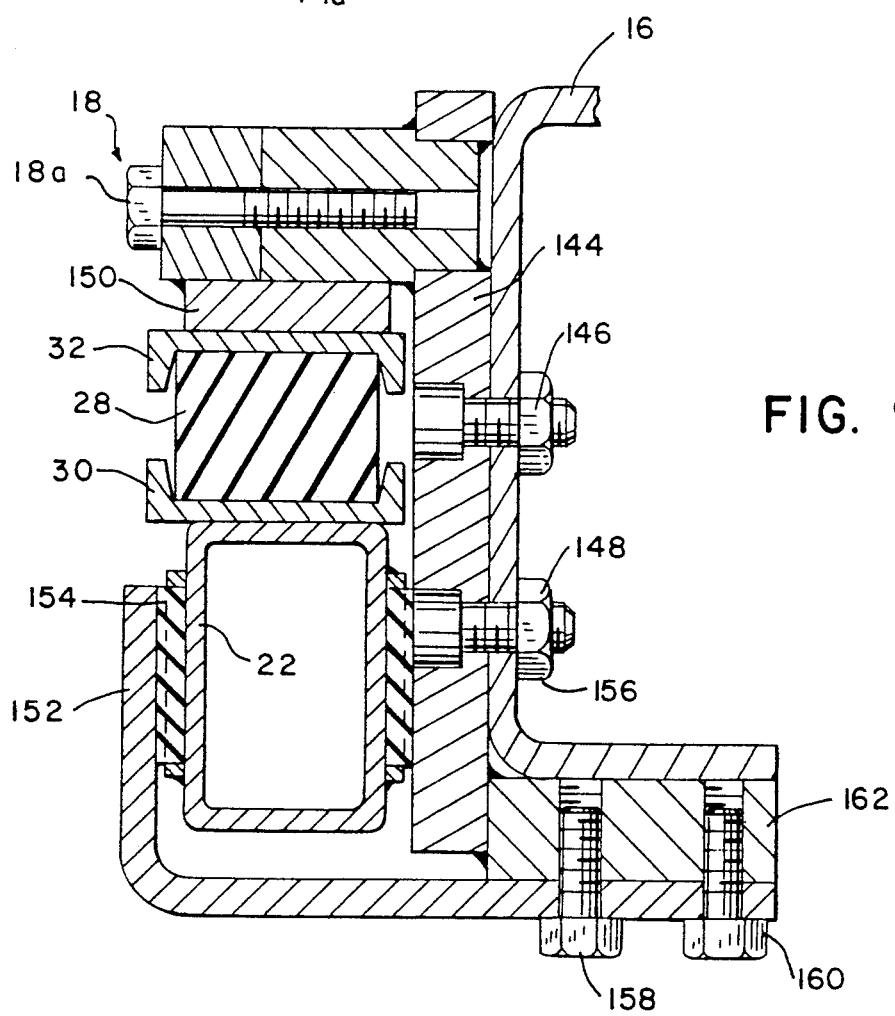
FIG. 9 is a cross sectional end view depicting the resilient means for mechanically isolating the suspension system from the vehicular frame, taken along line 9—9 of FIG. 1.

FIGS. 9 and 10 depict this isolating means. In FIG. 9, the vehicular load is carried by an L-shaped member 144 which is bolted to frame 16 via bolts 146 and 148. Bolts 146 and 148 merely keep member 144 and frame member 16 together; they are not subjected to shear forces due to the vertical load being carried by member 162. Pivot 18 is welded to an intermediate member 150 which in turn is welded to a U-shaped retaining member 32. Pivot bolt 18a does not support a shear load but keeps resilient cushion member 150 in position. Vertical loads are transferred to member 144 since member 150 lies against the extension of member 144. A crowned front to rear resilient block 28 is disposed between member 32 and an opposing, U-shaped member 30. Member 32 is connected to suspension arm 22. When suspension arm 22 moves in an upward direction due to roadway discontinuities encountered by the wheel, the resultant shock forces are absorbed in a progressive manner by captured resilient block 28 and thus are not transmitted to frame 16 or to the vehicular body.

A capturing strap 152 controls the lateral movement of suspension arm 22. A pair of resilient, rubber members 154 and 156 are disposed on opposite sides of suspension arm 22. Resilient member 154 minimizes the transmission of shock forces to capturing strap 152. Similarly, rubber member 156 minimizes the transmission of shock forces to L-shaped member 144. Capturing strap 152 is bolted to member 144 via bolts 158 and 160.

The isolating means also prevents shock forces from being transmitted from the suspension and shock absorber system to the frame via pivots 20 and 52 (FIG. 1). Since pivots 20 and 52 have a similar construction, only pivot 20 will be discussed. FIG. 10 is a top view of pivot 20, shown in partial section. In FIG. 10, suspension arm 22 is mechanically isolated from a pivot bolt 20a via a rubber bushing 20b. Pivot bolt 20a is retained via an U-shaped member 20b and a nut 20c. The U-shaped member is retained from rotation around pivot bolt 20a by two pins welded to member 20b and inserted into mating holes of frame rail 16.

Figure 11:
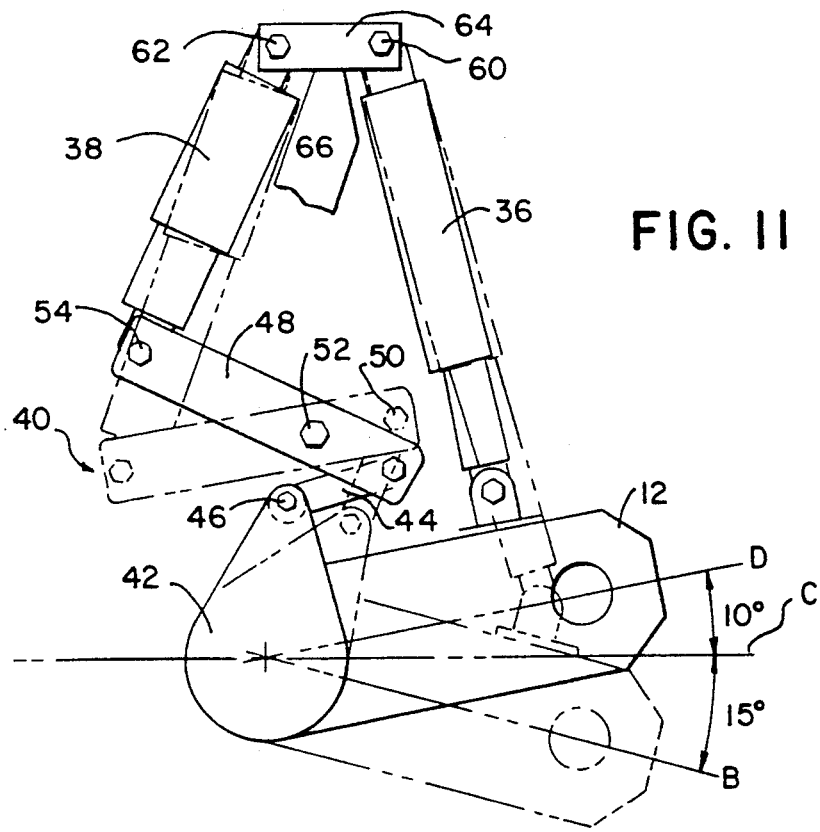
FIGS. 11 through 13 depict several positions of the shock absorber system according to the present invention.
Figure 12:
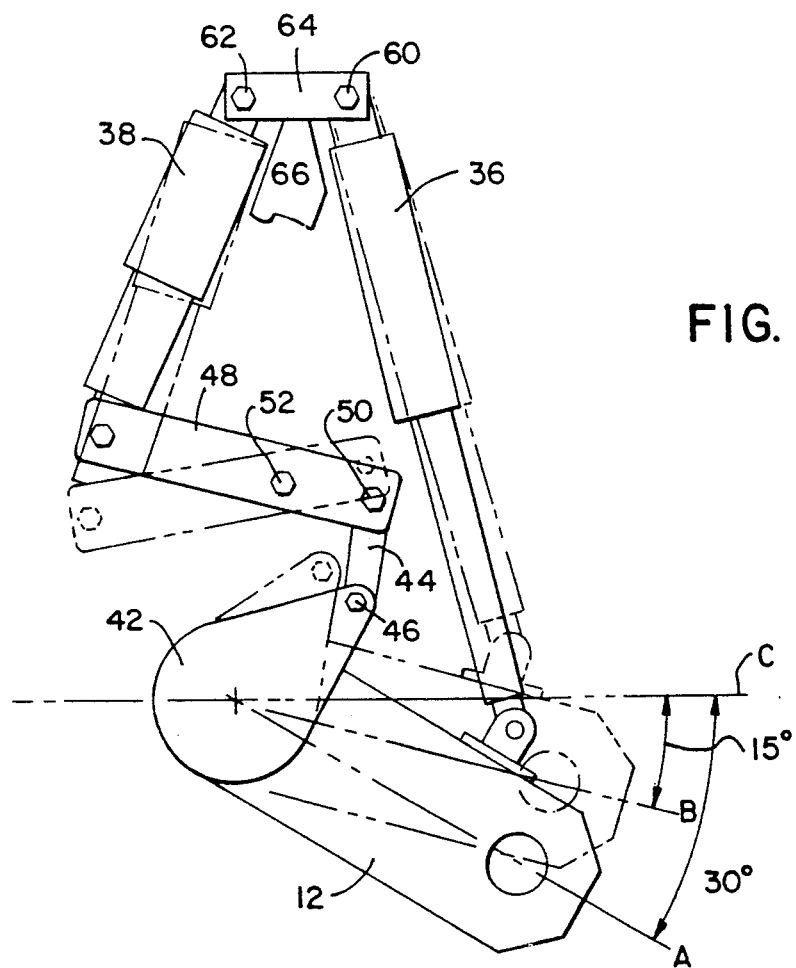
Figure 13:
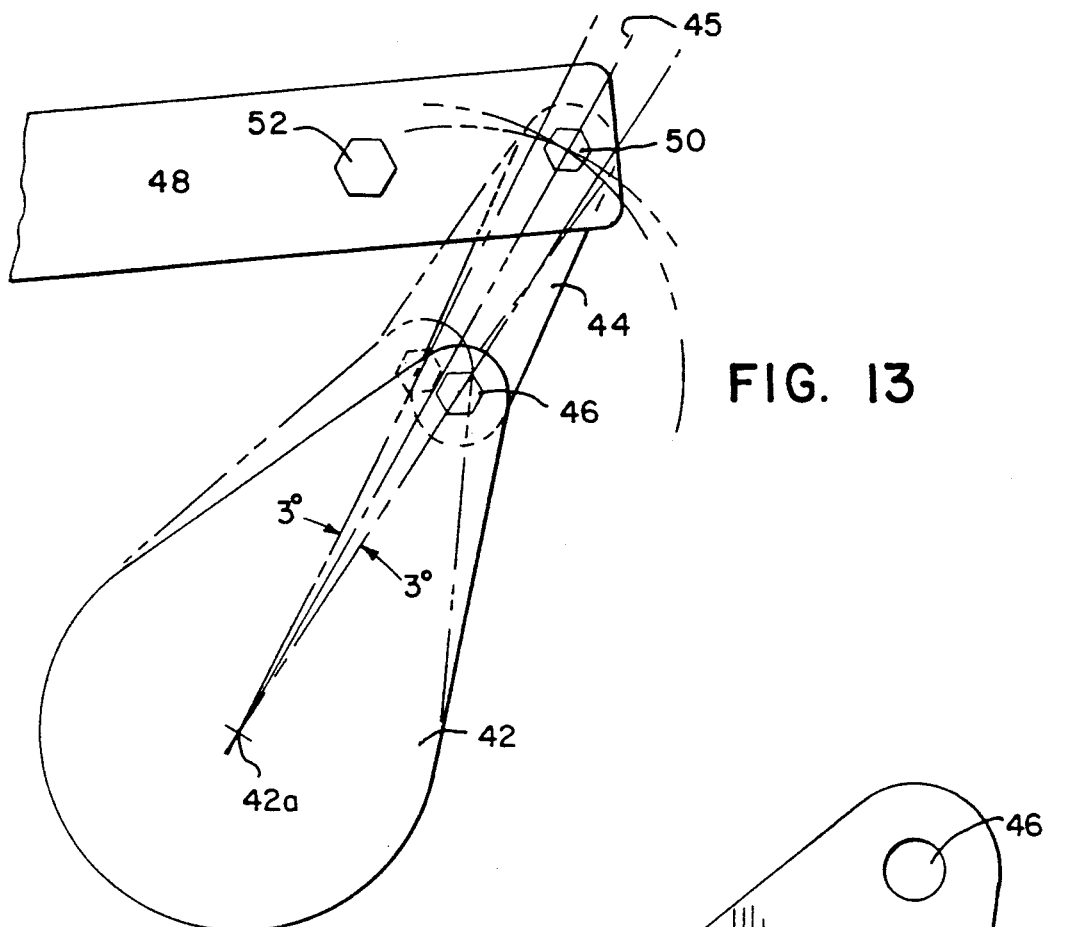

FIGS. 11-13 are diagrammatic views depicting several stages of operation of the unique shock absorber system according to the present invention.

In FIG. 11, the phantom position B corresponding to the 15° arc represents the position of the shock absorber system at so-called "curb weight". The curb weight position assumes that the unloaded vehicle's weight is being supported by the system. Note that in this position secondary shock absorber 38 is essentially fully extended. The solid line position D in FIG. 11 corresponding to the 10° arc represents the maximum travel of the shock absorber system when the system reaches its bump stop 13. Horizontal line C represents a reference line, as discussed below.

Whenever a large road discontinuity is encountered by the wheel or when the vehicle leans during a sharp turn, the substantial rotation of arm 12 in the counterclockwise direction causes secondary shock absorber 38 to be compressed. Secondary shock 38 then passes through its curb weight position B as arm 12 rotates in the clockwise direction, as indicated in phantom. Secondary shock 38 then again becomes compressed, corresponding to position A, so that it essentially cycles twice whenever a large discontinuity is encountered by the wheel. By cycling twice, shock absorber 38 essentially acts like a shock absorber having twice its length. Thus, if shock absorber 38 has a 4½" stroke, it acts like a shock absorber having a 9" stroke. To use a 9" stroke shock absorber instead would require 24" of space, which is not available on most vehicles.

Moreover, the compression of secondary shock 38 is non-linear and progressive. Due to the design position of secondary shock pivot arm assembly 40, the upward acceleration of lever arm 48 and thus the compression of shock absorber 38 is non-linear to achieve optimum performance. That is, shock absorber 38 compresses at an increasing rate for every inch of arm 12 rotation. Since primary shock 36 is directly connected to arm 12, it is always working to absorb relatively small shock forces.

The suspension and shock absorber system also assists in vehicle braking. When the brakes are applied, arm 12 rotates counterclockwise, causing the rear end of the vehicle to be drawn down toward the roadway to level the vehicle. This levelling of the vehicle allows the rear brakes to operate more effectively. The present shock absorber system then controls the release of energy after the vehicle has stopped. In prior art systems, the rear end of the vehicle rises up during braking, shifting the effective weight of the vehicle and the majority of braking to the front wheels.

The solid lines in FIG. 12 depict the shock absorber system in its fully extended position, as if the vehicle has been jacked up and the wheels are hanging down. The phantom lines B in FIG. 12 indicate the curb weight position of the shock absorber system. As indicated in FIG. 12, the maximum angular movement of arm 12 is 30°, corresponding to about 5" of wheel travel.

FIG. 13 depicts another feature of the shock absorber system, namely the use of a "Dead Zone" during which secondary shock 38 is not being used. In a preferred embodiment, the secondary shock arm assembly is designed such that the Dead Zone encompasses 6° of movement of pivot 46 in the counterclockwise direction before secondary shock 38 begins to compress. The phantom position in FIG. 13 represents the upper end of the Dead Zone. The solid lined position represents the lower end of the Dead Zone, which is also the curb position. That is, pivot 46 moves from a negative 3° to a positive 3°, using a centerline 45 as a reference, without resulting in any secondary shock absorber action. Centerline 45 connects point 42a and pivot 50. The Dead Zone, in which there is no significant compression of the secondary shock absorber, is also created by the 6° rotation needed to compress the rubber pivot bushing around pivot bolt 52 before compression of the secondary shock is started.

The purpose of the Dead Zone is to allow primary shock 36 to absorb minor roadway bumps such as tar strips without secondary shock 38 being operated. Without the Dead Zone, secondary shock 38 would be compressed when tar strips and the like were encountered by the wheel, resulting in a much stiffer ride.

The secondary shock absorber is compressed after arm 12 rotates counterclockwise past the upper end of the Dead Zone. However, the secondary shock absorber is immediately extended if arm 12 rotates in a clockwise direction, as when the wheel falls into a pothole. This arrangement allows the secondary shock absorber to be positioned to absorb the large, subsequent bump when the wheel leaves the pothole.

As discussed above, the road height of the vehicle may be changed to accommodate different vehicular weights as well as different loads. When the road height would otherwise be decreased by a larger load, the torque absorption hub can be rotated by removing members 134, as discussed above in connection with FIG. 7, and by rotating the torque absorption hub one or more positions with respect to the axle tube. The lock members are then replaced. This repositioning of the torque absorption hub has the effect of also changing the relative orientation of the shock absorber assembly since arm 12 (FIGS. 11 and 12) is rotated in a counterclockwise direction when the torque absorption hub is repositioned. The repositioning of secondary shock arm assembly 40 would change the characteristics of the secondary shock arm operation in an undesirable way unless the secondary shock arm assembly is repositioned.

To compensate for the position change of arm 12, the present invention includes a means for repositioning the shock arm assembly to its original position, which is the curb weight position in FIGS. 11 and 12. This repositioning of the shock arm assembly is achieved by the repositioning mechanism depicted in FIG. 14.

Figure 14:
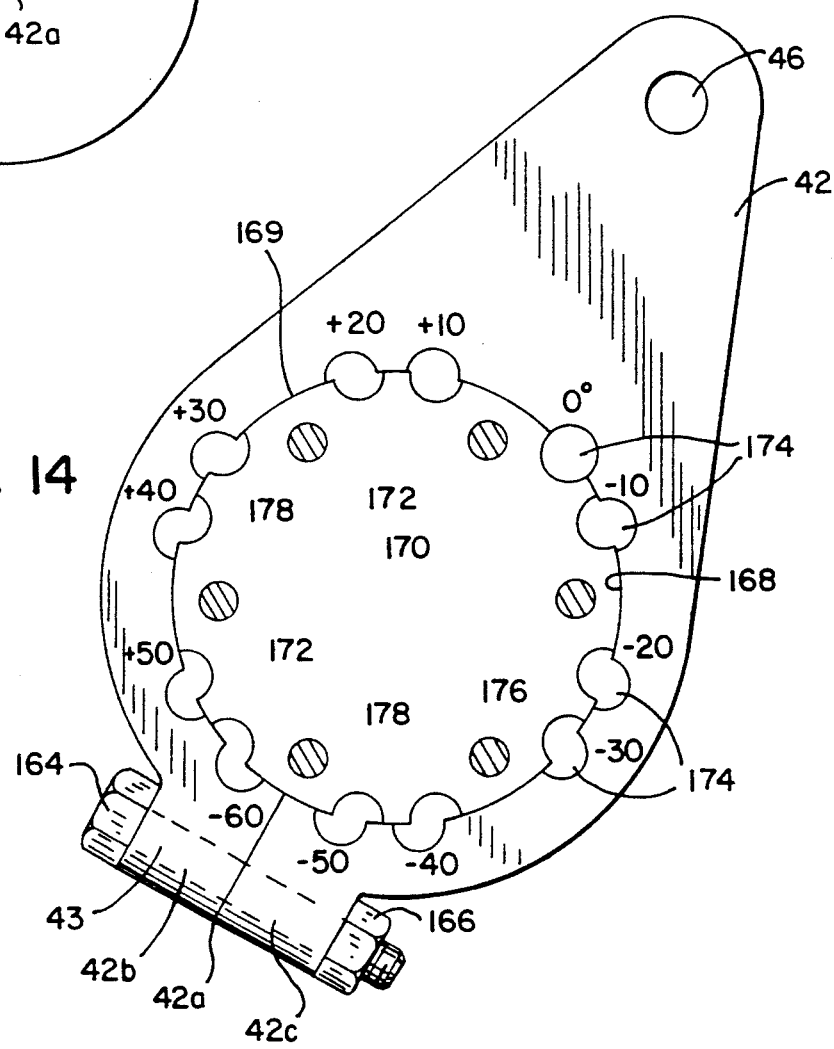
FIG. 14 is a top view of the means for repositioning the secondary shock arm when the vehicle road height is changed.

In FIG. 14, secondary shock arm 42 is split at split line 42a into corresponding parts 42b and 42c. Parts 42b and 42c have an aperture 43 therein adapted to receive a pinch bolt 164 which has an attached nut 166. When bolt 164 and nut 166 are removed, central opening 168 in arm 42 is able to receive a central, substantially Circular plate 170 which is connected by bolts and dowels 172 directly to arm 12. Opening 168 creates a substantially circular wall 169 in arm 42. Wall 169 has a plurality of unevenly spaced slots 174 which are preferably semicircular in shape. Similarly, outer wall 176 of plate 170 has a plurality of corresponding, unevenly spaced slots 178 therein. Slots 178 are also preferably semicircular in shape, although other shapes could be used as long as they match the shapes of slots 174. There are preferably twelve slots 174 and twelve slots 178, each slot corresponding to 1° of rotation of arm 42. With this arrangement, arm 42 can be repositioned 6° in the clockwise direction and 5° in the counterclockwise direction, with one of the slots corresponding to the zero position. Slots 174 and 178 are arranged such that only one slot 174 and one slot 178 ever line up at the same time. Thus, a locking member such as a drive pin (not shown) can only be placed in at most one slot 174 and one slot 178 at a time. Only a single locking member is used to lock the relative positions of arm 42 and plate 170. When the desired position has been locked, pinch bolt 164 is re-engaged with nut 166 through members 42b and 42c, thereby forcing Wall 169 against wall 176 and retaining the lock member in place.

Interlocking splines could be used instead of slots 174 and 178. However, such an arrangement would be more complex and expensive since splines would have to be provided along the entire wall 169 and the entire wall 176 so that 360 individual splines would be needed to accomplish a 1° rotation per spline.

Figure 15:
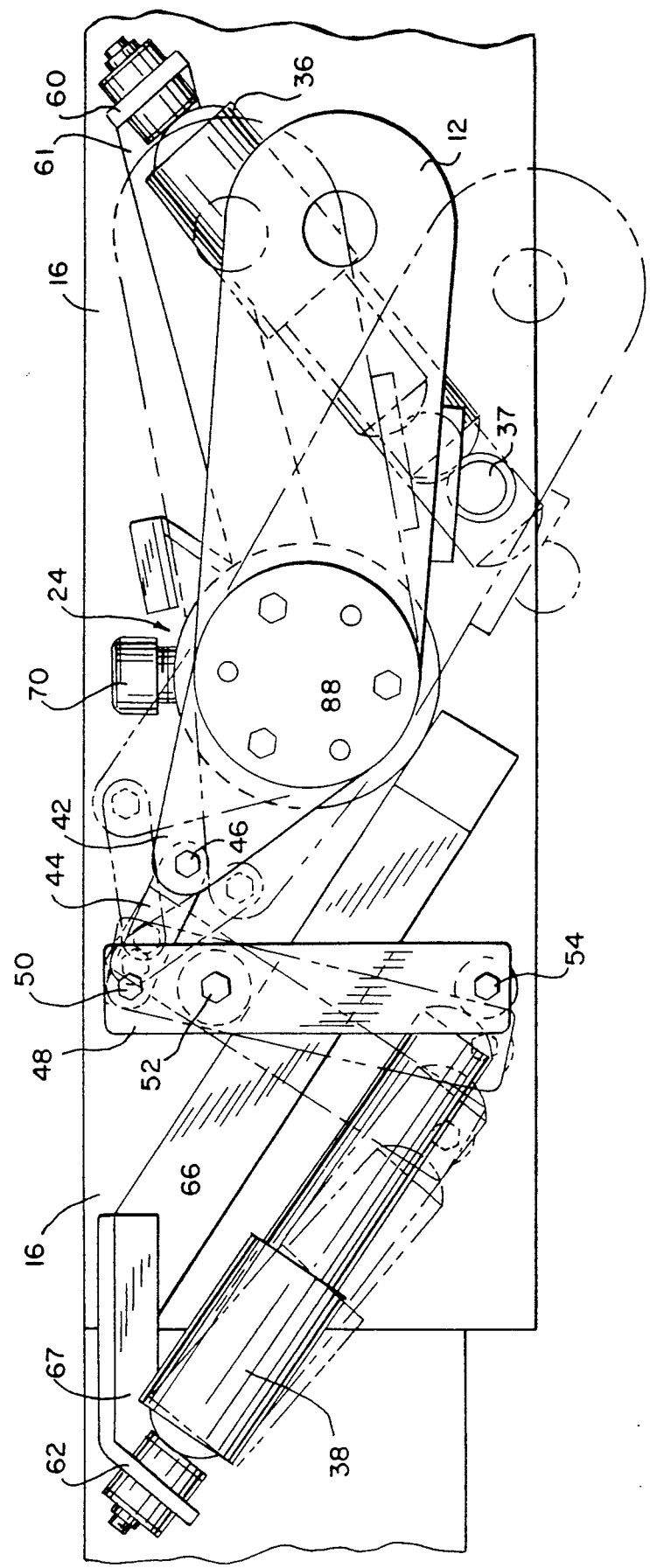
FIG. 15 is an alternate embodiment of the shock absorber system that is used on vehicles having small wheel wells or when a wide floor between the wheels is needed.

FIG. 15 depicts another embodiment of the shock absorber system designed for use on vehicles having minimal wheel well space. The shock absorber system depicted in FIG. 15 operates in a very similar manner to the one depicted in FIGS. 1, 11, 12 and 13, so a discussion of its operation will not be repeated.

To accommodate the different vehicular structure, shock absorbers 36 and 38 are placed on opposite sides of bearing housing 82 instead of generally above the bearing housing as in the embodiment of FIG. 1. The other structural differences are that primary shock 36 is connected to bearing housing 82 via its own support member 61 in FIG. 15. Secondary shock 38 is connected to bearing housing 82 via support members 66 and 67. Also, primary shock 36 is now connected to the underside of arm 12 at a point 37 instead of being connected to the upper portion of arm 12 as depicted in FIG. 1.

Although several embodiments of the present invention have been shown and described, alternate embodiments will be apparent to those skilled in the art and are within the intended scope of the present invention. Therefore, the present invention is to be limited only by the following claims.

I claim:

1. A suspension system, comprising:
   an axle housing having a longitudinal axis, having at least one axle housing aperture therein, having a substantially cylindrical inner surface portion, and having an axle end;
   a rotatable arm disposed near said axle end;
   at least two torsion bars spaced from the longitudinal axis of the axle housing, each of said torsion bars having a first bar end and a second bar end, said first bar ends being interconnected with said arm;
   a removable torque absorption hub interconnected with said second bar ends and disposed within said axle housing, said hub having a substantially cylindrical outer surface; and
   a change mechanism, detachably connected to said torque absorption hub, that retains said torque absorption hub in a fixed position when said change mechanism is affixed to said hub, and that enables the relative position between said torque absorption hub and said axle housing to be changed when said change mechanism is detached from said hub, said change mechanism including a releasable lock member disposed in said axle housing aperture to engage said outer surface of said hub when said hub is in said fixed position.

2. A suspension system, comprising:
   an axle housing having a first axle housing end and a second axle housing end;
   a first rotatable arm disposed near said first axle housing end;
   a second rotatable arm disposed near said second axle housing end;
   a central housing disposed within said axle housing and having a first central housing end interconnected with said first rotatable arm; and
   an anti-sway bar disposed within said central housing having a first bar end interconnected with said first rotatable arm and a second bar end interconnected with said second rotatable arm.

3. The suspension system of claim 2, further comprising:
   a first torque absorption hub disposed within said axle housing;
   a first torsion bar having a first end interconnected with said first rotatable arm and having a second bar end interconnected with said first torque absorption hub;
   a second torque absorption hub disposed within said axle housing; and
   a second torsion bar having a first end interconnected with said second rotatable arm and having a second bar end interconnected with said second torque absorption hub.

4. The suspension system of claim 3, wherein said first torsion bar and said second torsion bar both have substantially rectangular cross-sections throughout their entire lengths.

5. The suspension system of claim 2, further comprising:
   a first bearing assembly interconnected between said first rotatable arm and said first axle end, including:
   a first raceway;
   a first plurality of bearing needles disposed on said raceway, each of said bearing needles rotating at least 180° when said first arm rotates 3° or more; and
   means for lubricating said bearing needles.

6. The suspension system of claim 5, further comprising:
   a second bearing assembly interconnected between said second rotatable arm and said second axle end, including:
   a second raceway; and a second plurality of bearing needles disposed on said second raceway, each of said bearing needles rotating at least 180° when said second arm rotates 3° or more; and means for lubricating said second bearing needles.

7. A suspension system for use on a vehicle, said vehicle having a frame, comprising:
- a first rotatable arm adapted to having a wheel interconnected therewith, said arm receiving shock forces when said wheel encounters a discontinuity in a road surface;
- an axle housing interconnected with said arm, said axle housing receiving a portion of said shock forces from said arm;
- a suspension member interconnected with said axle housing and receiving shock forces from said axle housing; and
- a resilient device disposed between said suspension member and said frame that minimizes the transmission of said shock forces from said suspension member to said frame.

8. The suspension system of claim 7, further comprising:
- a capturing member interconnected with said frame that limits the movement of said suspension member; and
- a second resilient device disposed between said capturing member and said suspension member that minimizes the transmission of shock forces from said suspension member to said capturing member.

9. The suspension system of claim 7, wherein said resilient device includes a rubber block.

10. The suspension system of claim 9, further comprising:
- a retainer that retains said rubber block.

11. The suspension system of claim 10, wherein said retainer includes:
- a first U-shaped member that is interconnected with said frame and that engages a first surface of said rubber block; and
- a second U-shaped member that is interconnected with said suspension member and that engages a second opposite surface of said block.

12. A shock absorber system for a vehicle, comprising:
- a rotatable primary arm adapted to receive a wheel, said arm travelling in a clockwise or counterclockwise direction when said wheel encounters a discontinuity in said roadway;
- a primary shock absorber having one end interconnected with said rotatable arm and an opposite end interconnected with said vehicle;
- a secondary shock arm assembly interconnected with said rotatable arm; and
- a secondary shock absorber having a first end interconnected with said secondary shock arm assembly and an opposite end interconnected with said vehicle.

13. The shock absorber system of claim 12, wherein said secondary shock arm assembly includes a lever arm connected to said first end of said secondary shock absorber.

14. The shock absorber system of claim 12, wherein said primary and secondary shock absorbers are selected such that said secondary shock absorber is significantly compressed only when relatively large roadway discontinuities are encountered by said wheel.

15. The shock absorber system of claim 12, wherein said secondary shock arm assembly includes:
- a secondary arm interconnected with said primary arm;
- a first lever arm interconnected with said secondary arm; and
- a second lever arm interconnected with said first lever arm and with said first end of said secondary shock absorber.

16. The shock absorber system of claim 15, wherein said second lever arm pivots about a stationary pivot.

17. The shock absorber system of claim 16, wherein said second lever arm has a first end interconnected with said first lever arm and a second end interconnected with said second lever arm, and wherein the distance between said second end and said stationary pivot is about 2.5 times the distance between said first end and said stationary pivot.

18. The shock absorber system of claim 15, wherein said primary arm, said primary shock absorber, and said secondary arm are connected such that the rotation of said primary arm in a counterclockwise direction compresses said primary shock absorber and also causes said secondary arm to rotate.

19. The shock absorber of claim 15, wherein said secondary arm moves a predetermined distance before said second lever arm moves.

20. The shock absorber system of claim 15, further comprising:
- first means for repositioning said rotating arm in a first direction to adjust the road height of said vehicle; and
- second means for repositioning said secondary arm in a second direction opposite said first direction to compensate for the repositioning of said rotating arm.

21. The shock absorber system of claim 20, wherein said second repositioning means includes:
- a central opening in said secondary arm, said opening defining a wall in said secondary arm, said wall having a plurality of spaced first slots therein;
- a plate disposed within said central opening, said plate having an exterior wall that substantially corresponds to said secondary arm wall, said plate wall also having a plurality of spaced second slots therein corresponding to said first plurality of spaced slots; and
- a locking member that is positioned in one of said first slots and in one of said second slots to fix the relative position between said secondary arm and said plate.

22. The shock absorber system of claim 21, further comprising:
- a securing mechanism that secures said arm wall against said plate wall.

23. The shock absorber system of claim 22, wherein said secondary shock arm has one split wall that divides said arm wall into two sides, and wherein said securing mechanism includes:
- an aperture in each side of said split wall; and
- a connector that engages said aperture to connect said split wall sides together.

24. The shock absorber system of claim 21, wherein said central opening is substantially circular.

25. The shock absorber system of claim 21, wherein said first slots and said second slots are spaced such that said locking member is positionable in at most one first slot.

26. A suspension system for a vehicle, said vehicle having a frame, comprising:
   an axle housing having a first axle end and a second axle end, said axle housing having a substantially cylindrical inner surface portion;
   a first rotatable arm disposed near said first axle end and adapted to receive a first wheel;
   a first torque absorption hub disposed within said axle housing and having a substantially cylindrical outer surface;
   first means for changing the relative position between said first torque absorption hub and said axle housing;
   a first torsion bar having one end interconnected with said first arm and an opposite end interconnected with said torque absorption hub;
   a second rotatable arm disposed near said second axle end and adapted to receive a second wheel;
   a second torque absorption hub disposed within said axle housing and having a substantially cylindrical outer surface;
   second means for changing the relative position between said second torque absorption hub and said axle housing;
   a second torsion bar having one end interconnected with said second arm and an opposite end interconnected with said second torque absorption hub;
   a central housing disposed within said axle housing and passing through said first torque absorption hub, said central housing having one end interconnected with said first rotatable arm; and
   an anti-sway bar disposed within said central housing having one end interconnected with said first rotatable arm and a second end interconnected with said second rotatable arm.

27. The suspension system of claim 26, further comprising:
   a first bearing assembly interconnected between said first rotatable arm and said first axle end, including:
   a first raceway;
   a first plurality of bearing needles disposed on said raceway, each of said bearing needles rotating at least 180° when said first arm rotates 3° or more; and
   means for lubricating said bearing needles.

28. The suspension system of claim 26, wherein sa changing means includes:
   a first aperture in said axle housing;
   a second aperture in said axle housing that is spaced from said first aperture;
   a first slot in said outer surface of said torque absorption hub;
   a second slot in said outer surface of said torque absorption hub, said second slot being spaced from said first slot;
   a releasable lock member that is disposed in said first aperture and in said first slot.

29. The suspension system of claim 26, further comprising:
   a first suspension member interconnected with said axle housing near said first axle end;
   a first resilient means disposed between said first suspension member and said frame for minimizing the transmission of shock forces from said first wheel to said frame;
   a second suspension member interconnected with said axle housing near said second axle end; and
   a second resilient means disposed between said second suspension member and said frame for minimizing the transmission of shock forces from said second wheel to said frame.

30. The suspension system of claim 29, wherein said first resilient means includes a first rubber block and wherein said second resilient means includes a second rubber block.

31. A suspension and shock absorber system for a vehicle, said vehicle having a frame, comprising:
   an axle housing having an axle end, said axle housing having a substantially cylindrical inner surface portion;
   a rotatable primary arm disposed near said axle end and adapted to receive a wheel, said arm traveling in a clockwise or counterclockwise direction when said wheel encounters discontinuities in said roadway;
   a primary shock absorber having one end interconnected with said rotatable arm and an opposite end interconnected with said vehicle;
   a secondary shock arm assembly interconnected with said rotatable arm;
   a secondary shock absorber having a first end interconnected with said secondary shock arm assembly and an opposite end interconnected with said vehicle;
   a torque absorption hub disposed within said axle housing and having a substantially cylindrical outer surface;
   means for changing the relative position between said torque absorption hub and said axle housing;
   a torsion bar having one end interconnected with said rotatable arm and an opposite end interconnected with said torque absorption hub;
   a central housing disposed within said axle housing, said central housing having one end interconnected with said rotatable arm; and
   an anti-sway bar disposed within said central housing having one end interconnected with said rotatable arm.

32. A suspension system, comprising:
   an axle housing having a substantially cylindrical inner surface portion and having an axle end;
   a rotatable arm disposed near said axle end;
   at least one torsion bar having a first bar and a second bar end, said first bar end being interconnected with said arm;
   a torque absorption hub interconnected with said second bar end and disposed within said axle housing, said hub having a substantially cylindrical outer surface;
   a change mechanism that changes the relative position between said torque absorption hub and said axle housing said change mechanism including
   a first axle aperture in said axle housing;
   a second axle aperture in said axle housing that is spaced from said first axle aperture;
   a first slot in said outer surface of said torque absorption hub;
   a second slot in said outer surface of said torque absorption hub, said second slot being spaced from said first slot; and
   a releasable lock member that is disposed in said first axle aperture and in said first slot.

33. The suspension system of claim 32, wherein said change mechanism further comprises:
   a connector that engages said lock member.

34. The suspension system of claim 33, wherein said lock member and said connector are threaded.

35. The suspension system of claim 32, further comprising:
a second releasable lock member that is disposed in said second axle aperture and in said second slot.

36. A suspension system, comprising:
an axle housing having a substantially cylindrical inner surface portion and having an axle end;
a rotatable arm disposed near said axle end;
at least one torsion bar having a first bar end and a second bar end, said first bar end being interconnected with said arm;
a torque absorption hub interconnected with said second bar end and disposed within said axle housing, said hub having a substantially cylindrical outer surface;
a change mechanism that changes the relative position between said torque absorption hub and said axle housing, said change mechanism including
six axle apertures spaced about the circumference of said housing to divide said circumference into six central angles, wherein three of the central angles created by said axle apertures is each about 63°;
six slots spaced in the outer surface of said torque absorption hub to divide said outer surface into six central angles, wherein three of the central angles created by said slots is each about 63°; and
at least one releasable lock member that is disposed in one of said apertures and in one of said slots.

37. The suspension system of claim 36, wherein said change mechanism further comprises:
a connector that engages said lock member.

38. A suspension system, comprising:
an axle housing having a substantially cylindrical inner surface portion and having an axle end;
a rotatable arm disposed near said axle end;
at least one torsion bar having a first bar end and a second bar end, said first bar end being interconnected with said arm;
a bearing assembly interconnected between said rotatable arm and said axle end, said bearing assembly having an aperture therein through which said torsion bar passes;
a torque absorption hub interconnected with said second bar end and disposed within said axle housing, said hub having a substantially cylindrical outer surface; and
a change mechanism that changes the relative position between said torque absorption hub and said axle housing.

39. The suspension system of claim 38, wherein said bearing assembly includes:
a raceway;
a plurality of bearing needles disposed on said raceway, each of said bearing needles rotating at least 180° when said rotatable arm rotates 3° or more; and
means for lubricating said bearing needles.

* * * * *

UNITED STATES PATENT AND TRADEMARK OFFICE
CERTIFICATE OF CORRECTION

PATENT NO. : 5,263,736
DATED : November 23, 1993
INVENTOR(S) : Stevens

It is certified that error appears in the above-indentified patent and that said Letters Patent is hereby corrected as shown below:

Column 17, claim 28, line 47, delete "sa" and substitute therefor --said--;
line 48, before "changing" insert --first--.

Signed and Sealed this

Twenty-sixth Day of April, 1994

Attest:

BRUCE LEHMAN

*Attesting Officer*   *Commissioner of Patents and Trademarks*